March 23, 1943.  W. LEATHERS  2,314,720

AUTOMATIC METER READING APPARATUS

Filed Oct. 18, 1940  2 Sheets-Sheet 1

INVENTOR.
Ward Leathers

March 23, 1943.  W. LEATHERS  2,314,720
AUTOMATIC METER READING APPARATUS
Filed Oct. 18, 1940  2 Sheets-Sheet 2
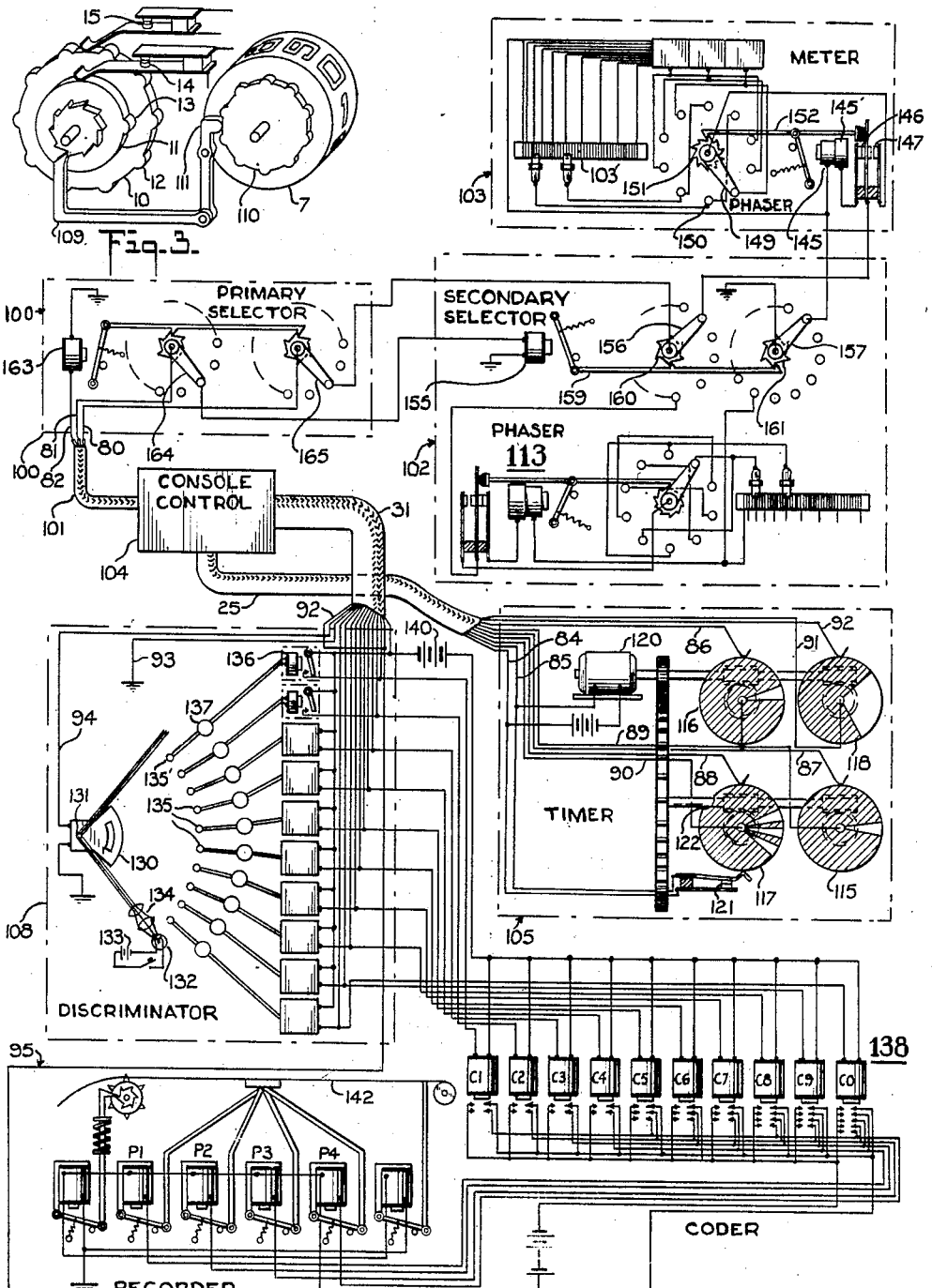

Patented Mar. 23, 1943

2,314,720

UNITED STATES PATENT OFFICE 2,314,720

AUTOMATIC METER-READING APPARATUS

Ward Leathers, Brooklyn, N. Y., assignor, by mesne assignments, to International Business Machines Corporation Application October 18, 1940, Serial No. 361,798

5 Claims. (Cl. 177—351)

The present invention relates to the successive control of a number of devices from a point of control by the operation of a master control device at this point. The invention also relates to the selective control of such devices from the control point. In either instance the operation effected may be either manual or automatic, as desired.

More specifically, the present invention pertains to mechanism for controlling a system of meter-reading by wire such as is more completely set forth in my copending applications for Letters Patent, Serial Nos. 349,975 and 361,801, filed August 2, 1940, and October 18, 1940, respectively, for Automatic meter-reading apparatus.

The present invention may be referred to as a console or manual, i. e. a group of immediately accessible interrelated controls whereby functions hereinafter described may be obtained by the operator as desired.

It is understood that meter-reading by wire is accomplished by means of field selectors, requiring actuating by electric impulses from the central station, in order to pass from the identifying and reading of one meter to the identifying and reading of another meter.

The object of this invention is to provide an apparatus which will enable the operator to automatically read a series of meters, making automatic recordings of same.

Another object of this invention is to provide an apparatus which will enable the operator to selectively reach and read any individual meter out of a large series of meters.

According to another object of this invention, the maintenance of all phasing units in meters or selectors and in this console in proper phase with each other, is contemplated.

Another object of this invention is to provide an apparatus which will keep the operator fully informed concerning the meter being read at any time and of the total meters read or to be read.

Another object of this invention is to provide an apparatus which will permit the precise and accurate selection of any meter for the reading thereof and the return of all the intermediate selectors to a proper starting position for automatic reading.

Another object of this invention is to provide associated means whereby the reading cycle for an individual meter once started must be completed in order that the phasing device in the meter be left at a proper initial position.

A further object of this invention is to insure the full and complete impulse-time necessary for operating field selectors and local numbering devices so that there shall be no chance of their getting out of phase with each other.

A further object of this invention is to provide an apparatus of this character whereby, when certain predetermined points or numbers of meters have been reached, the apparatus will cease to function or a visual indication may be rendered.

Numerous other objects of the invention not at this time enumerated will become readily apparent as the nature of the invention is better understood.

In the accompanying drawings forming part of this application, one embodiment of the invention has been disclosed for illustrative purposes.

Figure 2 is a schematic plan showing the location of and the apparatus associated with the console-control.

Figure 3 is a detailed perspective view of a disc-actuating mechanism employed in connection with the present invention.

Figure 1:
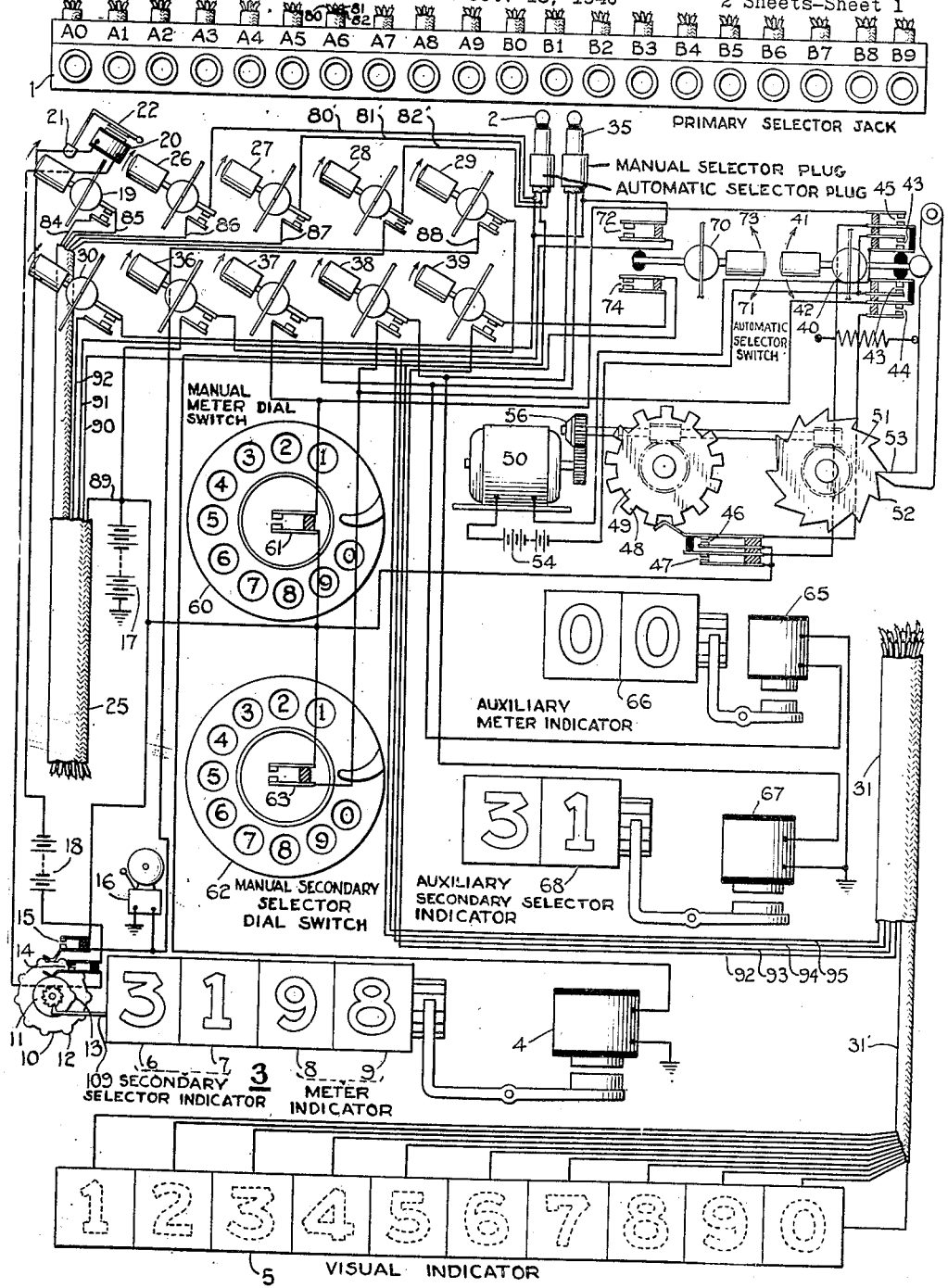
Figure 1 is a semi-schematic, semi-pictorial electric diagrammatic view of the mechanism involved in a console-control located at the central reading station.

In the telelector system as shown in Fig. 2, a central reading station may be electrically connected to any one of a multiplicity of primary selectors 100 by a three wire cable 101. Each primary selector 100 is electrically connected to a multiplicity of secondary selectors 102, and each secondary selector is similarly connected to a multiplicity of meters 103. In the present embodiment twenty primary selectors 100 are served, each being joined by three wires to a three-contact jack as at 1 in Fig. 1. By means of the three-contact plug 2 the operator may select any one of the twenty primary selectors 100 in Fig. 2 by inserting the plug 2, Fig. 1, into that selector's corresponding jack. The twenty primary selectors, each of which serves 10,000 meters, are numbered A0 to A9 and B0 to B9. The present embodiment employs 200,000 meters for purposes of convenience, therefore only the A and B designations are shown in this console represented as a box 104 in Fig. 2. Where a series of 2,600,000 meters may be desired the entire alphabet would be used. If one hundred meters were wired to each secondary or local selector and one hundred local selectors were wired to each primary selector it would give ten thousand meters to each primary selector and a series for the entire alphabet of 2,600,000 meters with serial numbers from A0-0000 to Z9-9999.

As shown in Fig. 1, a counter or register, generally characterized by the numeral 3 and advanced by a coil 4, is wired so that each time the secondary selector 102, in Fig. 2, is advanced one position by an automatic timing device 105, the coil 4, in Fig. 1, receives one pulse of electricity. The number of four digits on the register 3 is the number of a meter with respect to the other 9,999 meters served by any one primary selector. Therefore, to get the complete identifying number of any meter, the number of the primary selector (the jack number) must precede the four numerals shown on the register. For example, the meter being read in Fig. 1, (if the plug 2 were inserted in the jack B4) would be "B43198," "3198" being the number shown on the register 3. (The number "B43198" completely identifies one meter out of a possible 2,600,000.) This number gives the number of the primary selector, expresses the number of the secondary selector which may be indicated in any suitable manner on the reel of paper on which the reading is recorded by a recording perforator 107 in Fig. 2, the number of the secondary selector, and the two numerals that identify the meter out of a possible one hundred. The two numerals "9" and "8" shown on the register 3 in Fig. 1 correspond to the values of two fixed identifying resistances in the meter. While the meter is being read these same two numerals flash as they are read in the order in which the resistance values are arranged in the meter, in a row of ten lights 5, each one corresponding to one of the ten digits.

In the row of ten lights 5, each light represents a numeral and is actuated by a numeral selector or reading board, characterized in Fig. 2 as 108 joined to it by the cable 31'. For example—each time the digit "7" is read by the reading board a light in row 5 flashes the numeral 7. Thus the counter 3 indicates the number of the meter that should be read while the series of three lights in the row 5 shows the number of the meter actually being read and hence the number being recorded. The number of the secondary selector being used is found by taking the numerals "3" and "1" in the register 3 and making them into a number in the order given. The number in the example given is thirty-one. This number positively identifies that selector out of a possible 26,000 selectors.

Referring both to Figs. 1 and 3, every time the indicator wheel 7 in the register 3 advances it rotates a shaft, to which two discs 10 and 11 are attached, one-tenth of a revolution by means of a pawl 109 and cam 110 and follower 111. On the disc 10 there are ten projections 12. Every time the disc is rotated one position one of these projections closes contactor 15 which pulses the primary selector 100 advancing it to the next secondary selector. It also rings a bell 16 by means of a battery 17. When the bell 16 rings the operator is informed that the reading of one hundred meters has been accomplished and makes note of it in a log. Every secondary selector 102 in Fig. 2 has a phaser generally characterized by the numeral 113, and two identifying resistance values just like a meter. Instead of the three last numerals being the reading of a dial or register, however, they are all zeros. This enables the secondary selector to be identified just like a meter. The identifying of a secondary selector is done in place of what should be each first meter of the hundred—leaving actually only ninety-nine meters to be read through the selector. The operator also checks the number of the new secondary selector by means of the lights 5 with the number of the selector that theoretically should now be in the circuit. If they show an error, the operator can find the right selector by a method to be described later.

Every time the counter wheel 7 and the discs 10 and 11 make one complete revolution, one thousand meters have been read, and it may be desirable to stop automatic recording and change the reel of paper in the recorder. In that case, the disc 11 closes a contactor 14 by means of a projection 13 thus energizing a coil 20, in Fig. 1, by means of a battery 18. The coil 20 by means of a plunger 21 attached to its armature 22 opens a switch 19 thus shutting off the whole system. When the operator desires to renew automatic recording, he closes switch 19 which starts the timer 105, Fig. 2, and thus starts the whole system automatically working again. A cable 25 joins the console-control 104 to the automatic timer 105. This auto-timer gives impulses to the secondary selector by means of a disc 115 and to the phaser in the meter by means of a disc 116. It also provides for spaces on the recording tape between different meter-readings by means of a disc 117. A switch 26 in Fig. 1 is disposed in series with the phaser pulse line so that the pulses going to the phaser in the meter may be shut off any time desired. A switch 27 is disposed in series with the secondary selector pulse line; a switch 28 with the primary selector pulse line; a switch 29 in series with the spacer line that goes to the recorder through a cable 31. A switch 30 is disposed in series with the reading line which goes to the reading board through cable 31 and whose timing is accomplished by a disc 118 in the timer 105, Fig. 2. A switch 19 is the power switch for the timer which when opened will stop a motor 120 after one full meter-reading has been completed. This delayed stopping action is supplied by a contactor 121 and depression 122 in the disk 117. By means of switches 19, 26, 27, 28, 29 and 30 the automatic operation of the entire system may be controlled. To start the system working the operator first closes switches 26, 27, 28, 29 and 30; then he closes the switch 19 which starts the auto-timer operating. Means also have been provided for pulsing the selectors and phasers of the system by hand instead of automatically. These facilities are needed in case a meter must be read out of sequence, or as desired. Another reason might be the desire or necessity for starting the system in the middle of any sequence instead of at the beginning. These facilities may also be used to correct an error in phase in any selector or meter-phaser, the said error being made clearly evident to the operator by the figure strip 5, or the recordings.

To pulse any part of the system manually a plug 35 in Fig. 1 must be inserted in a jack 1 of the desired primary selector, and the proper switches manipulated as follows: A switch 36, is in series with the meter manual pulsing line; a secondary selector switch 37 is in series with the secondary selector manual pulsing line; a primary selector switch 38, in series with the primary selector manual pulsing line; a switch 39 in series with the manual spacing line. Only when one of these switches is closed and plug 35 is in a jack may one of the aforementioned operations be performed. The primary selector may be pulsed in rapid succession by closing switch 38 and holding a double throw switch 40 in position 41. Movement of the switch 40 to the position 41 serves to close a pair of contacts 43 and energize the motor 50 by means of the battery 54. Simultaneously with the closing of the contacts 43 a pair of contacts 44 also become closed. With the contacts 44 thus closed, current from the positive side of the battery 17 intermittently flows through the contacts 46, which are controlled by the projections 48 on the disc 49, through contacts 44, switch 38 to the plug 35 for pulsing the primary selector.

The secondary selector may be pulsed in rapid succession by closing the switch 37 and holding the double throw switch 40 in the position 42. Movement of the switch 40 to the position 42 serves to close a pair of contacts 43' and energize the motor 50 by means of the battery 54. Simultaneously with the closing of the contacts 43' a pair of contacts 45 become closed. Upon closing of these latter contacts current from the battery 17 intermittently flows through the contacts 47 which are controlled by rotation of the disc 49, through contacts 45 and switch 37 to the jack plug 35 to pulse the secondary selector. The instant the switch 40 is released, the motor circuit becomes open and the wheel 49 will stop rotating and remain in a position that will keep contact 47 open. This is accomplished by a wheel 51 that has ratchet teeth on its edge that are equal in number to the number of projections on wheel 49. A pawl 53 catches on one of the teeth 52 and stops the motor quickly and the wheels 49 and 51 substantially instantly by means of a clutch 56 when the switch 40 is in the "off" position shown. When the switch is thrown to either of the "on" positions, the pawl 53 is lifted from the teeth of wheel 51 by lever action. Therefore, if the wheels 49 and 51 are exactly synchronous the pawl will stop their rotation at a point that will keep contacts 46 and 47 open. Because of this action every pulse must be of full predetermined minimum time duration—partial pulses cannot be made.

Since every pulse is full-timed the coil that steps the selector and the indicator 3 must operate simultaneously and synchronously. Such pulsing is wholly practical even at the rate of ten per second or faster. However, in cases where only one or two pulses are needed, the operator might easily send too many pulses because of the speed with which they are sent by means of switch 40. Therefore, a dial mechanism 60 that closes contacts 61 as many times as the value of the number dialed is used to send pulses when only a few are needed as will be described presently.

A dial mechanism 62 is provided for manually pulsing the primary selector. The contacts 63 which are in series with the contacts of the primary selector switch 38 are adapted to be closed by the dial mechanism 62 as many times as the value of the numeral which is dialed. Current flowing from the positive side of the battery 17 through the contacts 63 and the contacts of the primary selector switch 38, to the jack plug 35, serves to apply impulses to the primary selector for the purpose of selection of the various secondary selectors. In order that the system may be pulsed properly, the operator must know how many pulses he has previously effected. The coil 67 is so connected that it operates each time a pulse is manually given to the primary selector. Each time it operates it advances a counter register 68 one numeral. The register 68 counts from "00" to "99" pulses and repeats its sequence inasmuch as there are only one hundred positions on the primary selector.

A dial mechanism 60 is also provided for manually pulsing the secondary selector. The contacts 61 which are in series with the contacts of the secondary selector switch 37 are adapted to be closed by the dial mechanism 60 upon rotation of the latter. A coil 65 is so wired that it operates each time a pulse is manually given to the secondary selector and each time it operates it advances a counter register 66, similar to the counter register 68, one numeral. The register 66 likewise counts from "00" to "99" pulses and repeats its sequence. Current flowing from the positive side of the battery 17 through the contacts 61, the contacts of the secondary selector switch 37 to the jack plug 35, serves to periodically pulse the secondary selector.

To illustrate a rather complex use of the manual means of meter-reading, let it be assumed that the plug 2 is in the jack A4. The automatic counter 3 then indicates that the meter bearing the designating number "A43198" is about to be read by automatic means. Should the operator, however, desire to read the meter designated by the number "A45341" by manual selection, the automatic system may be stopped by opening the switch 19. The plug 2 may then be removed from the jack A4 and the plug 35 substituted in its place. The counter register 66 stands at a reading of "00" and the register 68 stands at a reading of "31," as previously described. Switch 38 will then be closed and, since the hundreds and thousands digits, i. e., "53," of the numeral given in the above example, represents the contact position of the primary selector (or the identity of the secondary selector) the hundreds and thousands digits actually indicated on the register 68 must be advanced to correspond with the desired secondary selector indicated by the numerals "53." This may be accomplished by manipulation of the dial mechanism 62 in any suitable manner to cause the required number of impulses to be made by the contacts 63. For convenience, the numeral zero may be dialed twice to cause twenty actuations of these contacts and the numeral two may be dialed once to supply the balance of the two impulses necessary to bring the total up to twenty-two impulses. Alternatively, the same result may be obtained by holding the switch 40 in the position 41 until twenty-two impulses have been effected by opening and closing the contacts 46. The register 68 will thus have been advanced to the reading "53" indicating that the corresponding secondary selector numbered "53" has been selected and circuits established to the same through the jack plug 35 which is received in the jack socket A4.

Since the units and tens digits given in the above example represent the contact position of the secondary selector or the number of the selected meter, the units and tens digits actually indicated on the register 66 must be advanced to correspond with the desired meter indicated by the numeral "41." Since the register 66 indicates a reading of "00," this may be accomplished by manipulation of the dial mechanism 60 in any suitable manner to cause forty-one impulses to be made by the contacts 61. This may, for convenience, be accomplished by dialing the numeral zero four times and the numeral one once. Alternatively the switch 40 may be held in position 41 until forty-one impulses have been made by the contact 46. In either instance, the dial 66 will register the numeral forty-one indicating that the desired meter has been selected.

To read the selected meter the switch 38 is closed, thus joining the reading board to the meter circuit. The switch 36 is closed and the switch 70 is moved to its position 71, thus closing the switch 72 and applying an impulse to the phaser in the meter. The first numeral of the meter number, i. e., the numeral "3," will be indicated by the indicator 5. Five such impulses applied by the switch 70 will indicate in the row of lights 5 the numerals "4," "1," "x," "x," "x," (the three x's representing the consumption figure on the meter). Having read the required meter manually, the system must be returned to a condition where automatic reading was discontinued and from which point it should be resumed. The secondary selector is first given fifty-nine pulses and then the primary selector is given seventy-eight pulses, by methods described to bring the registers 68 and 66 back to their zero indication. Meter ninety-eight on local selector thirty-one is now in the pulse-read circuit. Interchange plugs at A4. First close switches 26, 27, 28, 29 and 30; (reestablish recorder circuit at recorder) close switch 19 and automatic-recorder functions are resumed. By thus pulsing the primary and secondary selectors, any meter in the entire system can be brought into the reading position. It should be noted that since the local selector is provided with identifying resistors and a phaser as aforementioned, the meter number "A45300" was passed or momentarily selected while selecting meter "A45341." As a check on the accuracy of the procedure thus far completed, the local selector "53" might well have been identified by stopping the selection long enough to read the numeral "A43000" in the manner previously described.

If a meter whose sequence number is 47 records "76454" (inclusive of meter number and register reading), obviously the phaser or stepping coil in the meter is one position out of phase. To correct this condition insert the plug 35 in its proper jack, close the switch 36, and push switch 70 into position 71 once. This closes contact 72 once and pulses the phaser in the meter once by means of battery 17 and the meter pulsing circuit. This circuit is completed each time switch 36 and contact 72, being in series, are both closed. Meter "47" will now record "47645."

It may be desirable to leave blank spaces between meter-reading on the paper record tape or to make other separation. To do this switch 39 must first be closed. Then switch 70 is pushed to position 73 as many times as there are spaces desired. Pushing switch 70 to position 73 closes contact 74 which completes the spacing circuit to the recorder as long as switch 39 is closed.

While there are only three outgoing lines in cable 101, four separate and distinct functions are to be accomplished. The reading of a meter and the pulsing of the phaser in the meter are accomplished over the same wire but at different times. The timing is accomplished by the timer 105, Fig. 2, to which cable 25 is joined. Secondary selector pulsing and reading is accomplished over one wire, and primary selector pulsing over another. This makes up the total of three wires. All circuits use ground as a common return.

The actual reading of the meter is accomplished by means of the reading board 108. The resistor 103' in the meter 103 is connected in series with the battery 17 and a voltmeter 130. The voltmeter 130 has a small mirror 131 mounted on the axis of the indicator needle instead of the needle. An electric bulb 132 powered by a battery 131 sends light through a lens system 134 which concentrates the light into a strong parallel beam. This beam of light is directed upon the mirror 131 in such a way as to reflect the light to one of ten photocells 135 depending upon the deflection of the meter, and therefore upon the angular displacement of the mirror. The resistor 103' controls the amount of current flowing through the meter 130 and therefore the amount of rotation given to the mirror 131. If the resistor should cause the mirror to reflect the beam of light onto the first photocell 135' a relay 136 would be energized by means of the photocell and an associated vacuum tube circuit 137. When the relay 136 closes, the bulb number one in the light row 5 in Fig. 1 is illuminated. A relay C1 in a coder, generally characterized by the numeral 138, is actuated at the same time by means of a battery 140. The relay closes two circuits. One circuit advances a tape 142 in a perforator 107. The other circuit causes a coil P4 to actuate, thus causing a hole to be perforated in a tape 142. This hole represents the numeral one in a special code. Each of the ten digits 0, 1, 2, 3, 4, 5, 6, 7, 8 and 9 is represented by one or more of the holes punched by coils P1, P2, P3 and P4. The process of reading, coding and recording is explained in more detail in application for Letters Patent Serial No. 349,975.

The timing of the entire mechanism is accomplished by the timer 105. As soon as the motor 120 is started the disc 116 causes a pulse of electricity to be sent over wire 80 in cable 101. This pulsation causes a relay 145 to operate, thus opening a contact 146 and closing a contact 147, and advancing a contact arm 149 one position to a contact 150 by means of a ratchet 151 and a pawl 152. The relay 145 is now completely removed from the circuit because of the opening of contact 146. However, it remains energized for an interval because of the influence of the copper jacket 145'. The first resistance to be read is introduced into the circuit by the closing of contact 147. The first resistance is connected in series with the voltmeter 130 and the battery 17 by means of the timer disc 118. The voltmeter 130 will rotate the mirror 131 a definite angle. The beam of light from the lamp 132 is then reflected to one of the ten photocells 135 thus causing one of the ten tube circuits 137 to close one of the ten relays 136. A digit corresponding to the resistance in the meter is then recorded on the tape 142 by the perforator 107 after being coded by the coder 138. After the first numeral has been read and recorded in this manner the relay 145 in the meter 103 will return to the normal position. This sequence of events repeats five times and then the disc 117 in the timer causes three blank spaces to be recorded on the tape 142. The disc 115 will cause an electro-magnet 115 in the secondary selector 102 to advance two arms 156 and 157 to the next position by means of a pawl 159 and ratchets 160 and 161. This causes another meter, similar to meter 103, to become wired into the reading and pulsing circuit from the central station. If the switch 19 in the console-control 104, Fig. 1, is open, the timer will automatically stop when the depression 122 in the circumference of disc 117 causes contacts 121 to open. If switch 19 in Fig. 1 is closed the timer will continue to operate. After the secondary selector has been advanced one hundred times an electro-magnet 163 in the primary selector 100 advances two arms 164 and 165 to the next contact thus connecting a new secondary selector 102 to the main line. Each secondary selector has in it a complete set of reading equipment 113 just like the meter 103.

The secondary selector itself is then identified in place of what should be the first meter. Since there is no consumption record to be transmitted the first three numerals carry only intelligence and are used for identifying the secondary selector.

What is claimed is:

1. In an impulse sending device for transmitting a predetermined number of electrical impulses over a circuit to actuate a remotely disposed step-by-step mechanism, a source of impulse current, a normally open impulse sending switch in said circuit adapted to be periodically closed to close the circuit through the source and create an impulse in the circuit, a counter mechanism for cumulatively indicating the impulses applied to the circuit, a solenoid for actuating the counter mechanism and operatively connected in the impulse circuit, an electric motor, means operable upon actuation of the motor for periodically closing the switch, a motor circuit and source of current supply therefor, a manually operable switch for closing the motor circuit at will for an approximate predetermined length of time to cause the motor to actuate the impulse switch and cause the counter mechanism to approximately indicate the predetermined number of impulses, a second impulse switch in the impulse circuit in parallel with said other impulse sending switch, and manually operable means for opening and closing the latter impulse sending switch a selected number of times at one manual operation thereof to transmit to the impulse circuit a number of impulses sufficient to bring the total number thereof applied to the circuit by both switches to the predetermined number.

2. In an impulse sending device for transmitting a predetermined number of electrical impulses over a circuit to actuate a remotely disposed step-by-step mechanism, a source of impulse current, a normally open impulse sending switch in said circuit adapted to be periodically closed to close the circuit through the source and create impulses in the circuit, an actuating arm carried by the switch, a wheel mounted for rotation about an axis, a plurality of cam projections on the wheel designed for contact with the arm to periodically close the switch upon rotation of the wheel, an electric motor, means connecting the motor and wheel in driving relationship, a toothed wheel mounted for rotation about an axis, means synchronizing the movements of the two wheels, a motor circuit and a source of current therefor, a manually operable switch for closing the motor circuit at will for an approximate predetermined length of time to cause the motor to rotate said wheels to actuate the impulse switch a number of times commensurate with the length of time the motor circuit is closed, a braking pawl normally engaging the teeth on said toothed wheel, means connecting the pawl and manually operable switch for withdrawing the pawl from engagement with said teeth when the latter switch is closed, a second impulse switch in the impulse circuit in parallel with the other impulse sending switch, and manually operable means for opening and closing said latter impulse sending switch a predetermined number of times at one manual operation thereof.

3. In an impulse sending device for transmitting a predetermined number of electrical impulses over a circuit to actuate a remotely disposed step-by-step mechanism, a source of impulse current, a normally open impulse sending switch in said circuit adapted to be periodically closed to close the circuit through the source and create an impulse in the circuit, an electric motor, means operable upon actuation of said motor for periodically closing the switch, a motor circuit and source of current supply therefor, a manually operable switch for closing the motor circuit at will, means operable when said manually operable switch is open for applying a braking torque to the motor, means for rendering said latter means ineffectual when said manually operable switch is closed, a second impulse sending switch in the impulse circuit in parallel with said other impulse sending switch, and a finger release dial mechanism for actuating the latter impulse sending switch a predetermined number of times at one operation thereof.

4. In an electrical transmitting and recording system, a plurality of groups of meters, means for successively selecting a group of meters, means for successively selecting a meter within a group, a central recording station, a plurality of impulses transmitting channels connecting the meters of each group to the central station, a trip register at the central station including a plurality of geared indicating elements decimally related in ascending digital order for sequential movement incrementally in a decimally progressive sequence, certain lower digital indicating elements serving to indicate the selection of individual meters within the groups and certain other higher digital indicating elements serving to indicate the selection of the meter groups, means operable upon selection of each meter for tripping the register, and means operable upon movement of said higher digital indicating elements for rendering said meter-group selecting means operative.

5. In an electrical transmitting and recording system, a plurality of groups of meters, means for successively selecting a group of meters, means for successively selecting a meter within a group, a central recording station, a plurality of impulse transmitting channels connecting the meters of each group to the central station, timing mechanism (115) for sequentially operating said latter selecting means, a motor for driving said timing mechanism, means for energizing the motor, a trip register at the central station including a plurality of geared indicating elements decimally related in ascending digital order for sequential movement incrementally in a decimally progressive sequence, certain lower digital indicating elements serving to indicate the selection of individual meters within the groups and certain other higher digital indicating elements serving to indicate the selection of the meter groups, means operable upon selection of each meter for tripping the register, means operable upon movement of said higher digital indicating elements for rendering said meter-group selecting means operative, and means operable upon movement of said higher digital indicating elements for rendering said timing mechanism inoperative.

WARD LEATHERS.